United States Patent [19]

Andersen

[11] Patent Number: 5,289,982
[45] Date of Patent: Mar. 1, 1994

[54] DISK RECLAIMER FOR USE WITH COHESIVE BULK MATERIALS

[75] Inventor: Ronald L. Andersen, Chubbuck, Id.

[73] Assignee: FMC Corporation, Philadelphia, Pa.

[21] Appl. No.: 29,741

[22] Filed: Mar. 11, 1993

Related U.S. Application Data

[63] Continuation of Ser. No. 819,728, Jan. 13, 1992, abandoned.

[51] Int. Cl.⁵ .................. B02C 19/12; B02C 23/00
[52] U.S. Cl. ................................. 241/296; 241/297; 241/300.1
[58] Field of Search ........... 241/189.2, 282.2, 300.1, 241/197, 102, 165.5, 296, 297; 56/374, 370, 366; 172/707, 708, 711

[56] References Cited

U.S. PATENT DOCUMENTS

| 367,845 | 8/1887 | Reid ...................... 172/707 |
| 465,173 | 12/1891 | Farquhar et al. ............ 172/707 |
| 851,580 | 4/1907 | Willis ..................... 172/708 |
| 3,827,505 | 8/1974 | Sosalla ................... 172/707 |

OTHER PUBLICATIONS

F. L. Smidth, Homogenising Stores, Type LDR Basic data for project planning, Publication No. 06A53–E83/86 (no date given).

Primary Examiner—Mark Rosenbaum
Assistant Examiner—John M. Husar
Attorney, Agent, or Firm—Robert D. Jackson; Frank Ianno

[57] ABSTRACT

A disk reclaimer, having spring mounted harrow and carrier teeth, is described. The spring loaded teeth are less subject to binding or breakage when reclaiming highly cohesive bulk materials such as phosphate shales.

4 Claims, 3 Drawing Sheets

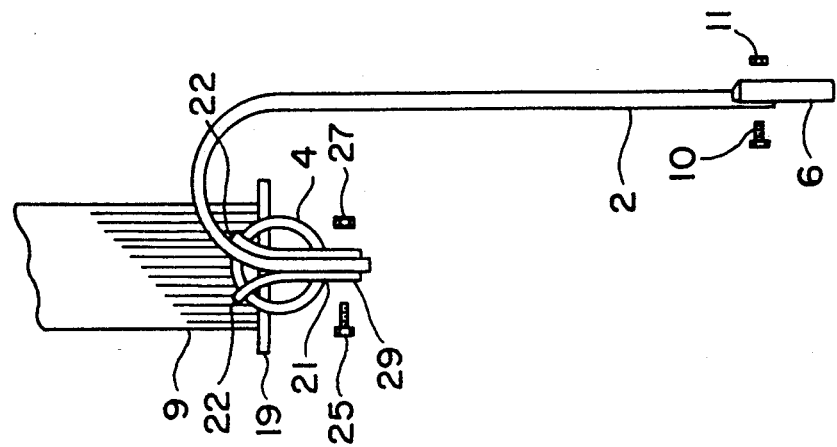
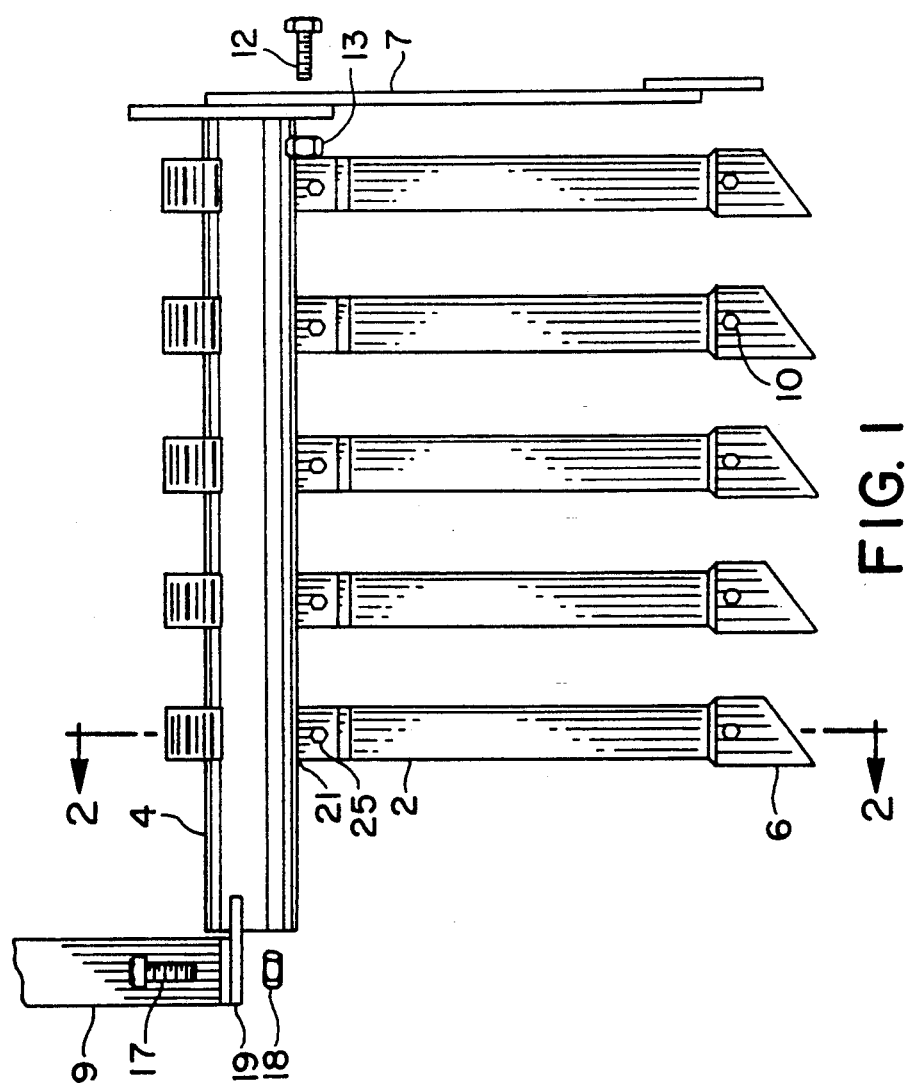

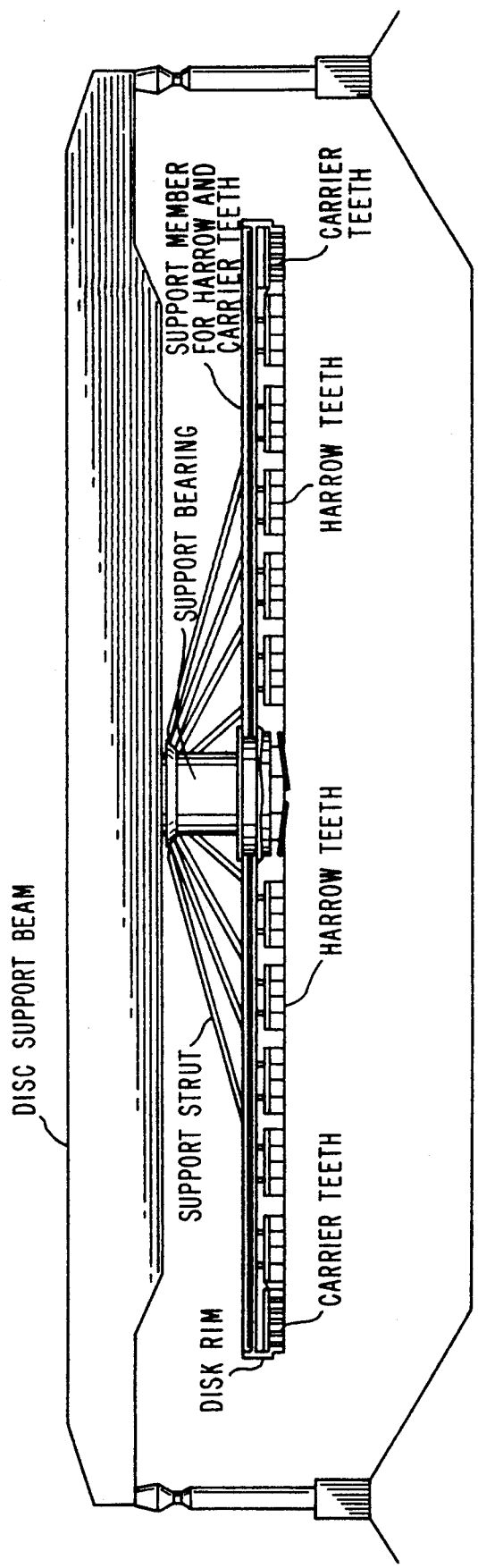
FIG. IA (PRIOR ART)

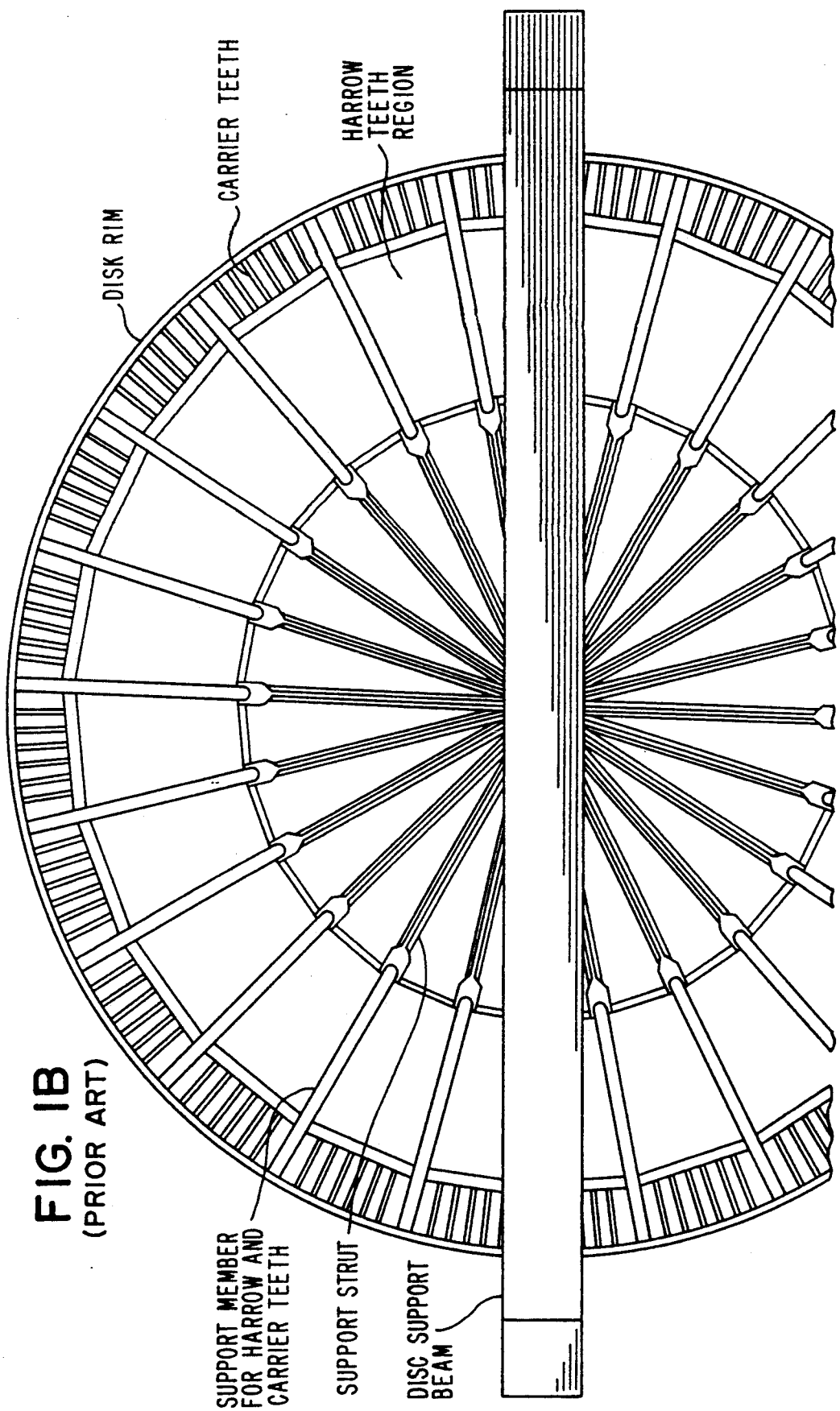
FIG. IB
(PRIOR ART)

DISK RECLAIMER FOR USE WITH COHESIVE BULK MATERIALS

This application is a continuation of application Ser. No. 819,728, filed Jan. 13, 1992 now abandoned.

BACKGROUND OF THE INVENTION 1. field of the Invention

This invention relates to a disk reclaimer. More particularly, the invention pertains to a disk reclaimer having modified teeth for improved blending and moving of cohesive bulk materials.

2. Discussion of the prior Art

In certain types of industrial operations involving the handling and processing of large quantities of bulk material, undesirable variations in the composition of the material can arise. For instance, the assay of ore specimens usually changes over the course of mining the ore deposits. As a consequence, when the ore is stacked, the resulting ore pile will not be entirely homogeneous. Such fluctuations in ore make-up can lead to inconsistent performance of the smelter furnace, even to decreased output. Accordingly, the ore is preferably subjected to some form of mixing treatment to render it more uniform in composition prior to use.

One technique for the blending and moving of large quantities of bulk materials make use of the disk reclaimer in a commercial process commonly referred to as reclaiming. Stated briefly, a disk reclaimer consists essentially of a spoked wheel of large diameter up to about 30 meters and having attached perpendicularly to the spokes, in a comb-like arrangement, a series of rod-like teeth.

The disk reclaimer is rotatably suspended from a horizontal supporting beam by means of a bearing located on the underside of the beam. The side of the disk containing the projecting teeth faces downward. Means are provided for turning the beam on its horizontal axis thereby allowing for the disk to be tilted. Linear travel of the entire assembly is provided by bogies on which rest the ends of the supporting beam.

The bulk material to be reclaimed is stacked in a continuous longitudinal pile situated within a trench. Along the sides of the trench are parallel tracks which engage the bogie under carriage of the supporting beam thereby enabling the disk and its supporting structure to traverse the length of the trench.

The reclaiming operation begins by advancing the disk assembly along the tracks until the disk reclaimer contacts the end of the pile, and the teeth on the spokes penetrate into the pile material. At the same time, the disk is set to rotating, the peripheral speed being generally about 1 meter per second. The tilt angle of the disk depends on pile height and the angle of repose of the bulk material.

In effecting disk reclaiming, three functional elements of the disk come into play. These elements comprise the harrow teeth, the carrier teeth and the rim. The harrow teeth occupy the inner circular regions of the disk which takes up most of the total disk area. The harrow region comprises the spokes and horizontal cross members connecting the outer ends of the spokes. Viewed from above, the harrow area of the disk resembles a polygon the periphery or perimeter of which is defined by the horizontal cross members constituting the sides of the polygon. Between the periphery of the harrow region and the disk circumference is the circular carrier area, generally about two feet in width, in which the carrier teeth are located. The disk circumference is surrounded by a flat wall-like rim.

The reclaiming process involves interaction of these functional elements. As the reclaimer disk rotates, the harrow teeth in the large inner area of the disk, agitate the pile face causing material to flow down to the outer circular band containing the carrier teeth. These teeth perform a similar digging function to that of the harrow teeth. In addition, the carrier teeth blend the material and carry it forwards and upwards by the raking action of the teeth to a side wall from where the material falls onto an outgoing conveyor belt and is transported to hopper or mill.

The harrow teeth are spaced far enough apart so as not to impede the movement of the loosened material as it tumbles down the pile face toward the outer carrier region. The carrier teeth, on the other hand, are spaced sufficiently close whereby material builds up ahead of the teeth as it is carried forward by the rotating disk.

As the reclaiming proceeds, a fresh pile of material is stacked in the trench. On reaching the end of the first pile, the disk is swung around on its horizontal axis into position against the new pile, this time rotating in the opposite direction.

Bulk materials generally fall within two categories commonly referred to as granular and cohesive.

Granular bulk materials are characterized by the presence of particles which do not deform nor bond together after compaction. Granular materials are not normally sticky and do not tend to cling to objects they come in contact with. Examples of granular bulk materials include sand, gravel, crushed stone, coal, etc.

A cohesive bulk material, with which the present invention is concerned, is one which can be tightly compacted resulting in high bulk density which remains unchanged even after removal of the compactive force. Cohesive materials contain many very fine, deformable particles, often clays, which cling together and to anything else they come into contact with.

When cohesive material freezes, especially after compaction, it forms a much more solid mass than a granular material. The cohesive material, with its finer particle size and particle deformation has a much greater particle contact area than granular material.

Phosphate shale, used in the production of phosphorus, is an example of a moist cohesive material having a high clay content. It also contains various amounts of rocks. As the shale is placed in the stockpile, the rocks roll to the bottom of the sides. As a consequence, of its own weight, the pile is compacted. During cold weather, the upper, exposed side and sloped faces of the pile freeze to a depth of up to 30 inches.

Although disk reclaiming is effective for blending of granular bulk materials, when the technique is applied to cohesive bulk materials, various problems are encountered. The basic cause of these problems can be attributed to the rigid mounting system of attaching the teeth to the spokes in presently designed disks.

In the case of the harrow section of the disk, the rigidly mounted racks of harrow teeth perform satisfactorily provided the pile material does not offer undue resistance to the movement of the teeth. For instance, when reclaiming phosphate shale in freezing temperatures, the slow forward motion of the reclaimer allows it to cut very thin layers of shale from the face of the frozen crust. The harrow racks can withstand the forces arising from this normal operation. However, contact of the harrow teeth with rocks embedded in the compacted pile face or frozen crust can generate resistive forces of sufficient magnitude to cause breakage of the harrow racks, their mounts or even the spokes of the disk.

In the case of the carrier section, problems associated with rigid mounting of the teeth are more numerous and complex than in the harrow region.

These problems can be described as follows:

1. Rocks and foreign matrix of transported material often catch between the carrying teeth and the face of the pile. Rocks in a cohesive bulk material create unique problems versus those which would be experienced in a granular material. In a granular material, rocks can displace material in the pile face ahead of the carrying teeth as they are transported in the bulk of carried material. In a cohesive shale, these same rocks cannot sufficiently compress or displace material in the already compacted pile face, so high forces are transmitted to the teeth, causing them to either bend or break.

2. In the original design, carrier teeth of triangular steel tubing were welded to a mounting tube in groups of five. Hard, wear resistant tips were epoxy glued into the end of each tooth. When tips were glued in place, the glue had to set for 24 hours before the tooth could be used. Field replacement of individual carrier teeth or tips was not possible. Whenever a tooth or tip needed work, a full rack of teeth had to be removed, and taken to the shop for repair.

3. A further problem with the rigid carrier teeth was that rocks of a certain size trapped in the flow patterns of the carrying zone became caught between teeth, providing a surface which carried shale and rocks past the discharge point and dropped it ahead of the disk. This is called forward spillage or carryover.

4. Compounding the forward spillage of shale is the tendency of the moist shale to compact on, and cling to the teeth. Loose shale "rides" on the clinging material, again spilling past the discharge point. Cold temperatures greatly aggravate the sticking material problem, increasing the forward spillage. Cleaning of the original carrier teeth to reduce carryover was not successful, because they were rigid, and many were always bent.

SUMMARY OF THE INVENTION

It is, accordingly, a principal object of the invention to provide a disk reclaimer for improved reclaiming of cohesive bulk materials. It is also an object of the invention to provide a disk reclaimer essentially free of the afore enumerated problems associated with prior art disk reclaimers. More specifically, it is an object of the invention to provide a disk reclaimer having a harrow tooth and carrier tooth mounting system capable of handling the stresses encountered in reclaiming cohesive bulk materials without damage to the mounting system. Other objects and purposes will become apparent in the ensuing description.

In accordance with the present invention, the objects aforesaid can be realized by replacing the rigid, integral tooth and rack mounting system in the harrow and carrier area of a reclaimer disk with a nonrigid mounting system comprising deflective teeth, separately attached to the horizontal member of the mounting rack. The degree of deflection is such that the normal reclaiming action of the disk is maintained but when excessive resistance or stress producing regions are encountered, such as embedded rocks, the teeth yield before the imposed force. Of course, once this zone of imposed force is traversed, the teeth assume their original position.

BRIEF DESCRIPTION OF THE DRAWINGS

FIG. 1 is a side view of a nonrigid, reclaimer disk tooth and rack mounting system of the invention.

FIG. 2 is a section view through FIG. 1 where designated.

DETAILED DESCRIPTION OF THE INVENTION

The deflective harrow and carrier teeth of the invention are fabricated from a flat strip of spring steel formed into the shape of the letter "J", the curved section being perpendicular to the plane of the flat surface. Affixed to the end of the tooth which contacts the pile face is a hardened removable tip.

The "J" teeth are attached to a tubular horizontal support member by fastening the short side of the "J" tooth to a bracket mounted on the support member. A preferred mounting bracket consists of two flat steel support strips, each flared at one end of substantially the same width as the "J" tooth and situated in two rectangular slots cut into the tubular members, the slots being disposed one above the other. The steel support strips are bonded firmly to the tubular member by welding or brazing for example, the space between the strips corresponding essentially to the thickness of the flat steel tooth. The flared ends of the support strip faces outward from one another and project above and perpendicularly to the top of the horizontal tubular member; the straight ends of the support strips project below the said member. The flat side of the steel supports face in the direction of rotation of the disk reclaimer whereas the edges are radially disposed.

The "J" tooth is attached to the mounting bracket by inserting the short side of the tooth into the space between the flared support strips and locked in place by means of a bolt passing through a hole drilled in the lower ends of the contiguous strips.

The resulting assembly of downwardly disposed "J" teeth are fitted into the harrow and carrier regions of the disk reclaimer. The number of the "J" teeth, their size and location on the disk correspond generally to the rigid tooth mounts heretofore. Operation of the improved disk reclaimer of the invention and its use in the reclaiming of bulk materials is essentially identical with presently designed commercial disks.

The number of the deflective "J" teeth attached to the tubular mounting rack is normally 5 for the carrier region and 6 for the harrow region.

In fabricating the "J" teeth, the flat spring steel strips of which it is made must give a spring rate sufficiently high enough to permit the normal function of the tooth without excessive deflection. In other words, the spring rate is adjusted to provide the harrow and carrier action of the present rigid tooth mounts but with enough flexibility to eliminate the latters susceptibility to damage when reclaiming cohesive bulk materials.

The spring rate or stiffness can be ascertained by mounting test specimens of the "J" tooth on the harrow and carrier racks of a disk reclaimer in which it is desired to incorporate the "J" tooth modification of the invention.

Generally speaking, the thickness of the "J" runs about 0.5 inch for working such bulk cohesive materials as exemplified by phosphate shale.

A highly beneficial and unexpected feature of the herein deflective "J" tooth is its capacity to flex in various directions in response to the imposed forces. For instance, as previously pointed out, in disk reclaiming the rotation of the disk is reversed as it traverses from one end of a longitudinal pile to the other. This means the disk teeth must be able to withstand the same stresses and conditions and provide the same performance, for either direction of rotation. The "J" teeth bear up very well to these opposing rotational forces.

The "J" shape of the tooth also permits vertical as well as horizontal displacement in the plane of the disk.

And finally, the "J" tooth is susceptible to a certain degree of lateral and/or twisting movement thereby contributing further to its ability to yield rather than bend or break under conditions of high stress.

The problem of rocks being caught between the carrier teeth is greatly reduced by these displacements which can occur relative to one another. Carryover of rocks has been reduced by an estimated 75% with the "J" spring tooth design.

As the spring teeth move through the pile, they tend to vibrate when striking rocks or other zones of high stress. This vibratory action prevents build up of material on the teeth face. The "J" teeth of the invention are thus self-cleaning, thereby reducing carryover and cleanup efforts.

Although it does not actually accumulate on the "J" teeth, some of the pile material does, in fact, cling to the flat leading surface of "J" tooth body. However, once this layer of material is formed, it remains fixed in place, neither decreasing or increasing in thickness to any appreciable extent. Apparently, the vibratory energy of the teeth is sufficient to prevent buildup of material but not sufficient to dislodge the adherent layer. In any event, the layer acts as a protective coating on the advancing tooth thereby greatly retarding wear of the front face.

From the foregoing, it can be seen that incorporating the "J" spring tooth design of the present invention exhibits a set of features and characteristics which cooperate to render such tooth design uniquely suitable for achieving improved disk performance in the reclaiming of coherent bulk materials being much superior in this respect to the rigidly mounted teeth heretofore.

Referring now to the drawings, FIG. 1A depicts in schematic form, a cross-sectional view of a disk reclaimer which is representative of present day designs. This sketch which is mostly self-explanatory shows only the basic disk structure, since the drive mechanism, control means and other features are not needed in distinguishing the invention from the prior reclaimer disks.

As will be observed, the harrow teeth occupy the central region of the disk and takes up most of the disk area. The outer remaining area of the disk between the periphery of the harrow region and rim constitutes the carrier region, a circular band about two feet wide for a disk in the 30 meter diameter range.

The harrow teeth, usually in a group of five, consists of vertical steel tubes welded to a horizontal mounting tube. The resulting rigid comb-like tooth rack is attached by vertical rods to the disk spokes.

The carrier teeth, are likewise bonded to a horizontal mounting tube extending from inside the rim to a vertical support projecting downwardly from the periphery of the harrow region.

The disk is suspended from the overhead support beam by means of a large bearing or pivot.

FIG. 1B depicts an overhead view of disk shown in FIG. 1B.

FIG. 1 is a side view of the carrier tooth rack of a reclaimer disk embodying the deflective tooth and its attendant mounting system of the present invention. The flat, deflective teeth 2 of spring metal are inserted into slots located on opposite sides of tubular support member 4 and bolted into place. Removable hardened tips 6 are fastened to the ends of the spring teeth with bolt 10 and nut 11. Support member 4 is fastened at one end by bolt 12 and nut 13 to the inner side of disk rim 7 and at the other end by bolt 17 and nut 18 passing through mounting plate 19 to the lower end of vertical member 9. Vertical member 9 is attached at its upper end to a cross member connecting the outer ends of the disk spokes.

FIG. 2 is a sectional view through the designated section of FIG. 1 showing the "J" spring tooth design of the invention and details of the mounting bracket 21 for removably attaching "J" tooth 2 to the horizontal tubular support 4. Mounting bracket 21 is formed of plates 22 inserted into slots cut through the walls of tubular support 4. These slots, generally of rectangular configuration, are situated one above the other. The upper slot is wider to accommodate the flared ends of plates 22. The lower ends of plates 22 protrude from the lower slot in tubular support 4. The flat sides of plates 22 are positioned against the edges of the slots and bonded, by welding or brazing, to tubular support 4. The short side of "J" spring tooth is inserted in the opening defined by flared plates 22 and secured in place by bolt 25 and nut 27 by way of hole 29.

I claim:

1. In a disk reclaimer, a tooth and mounting rack for improved reclaiming of cohesive bulk materials comprising:
   a. harrow and carrier teeth of flat spring steel formed into a "J" shape,
   b. a horizontal tubular support member having upper and lower open slots along its length, said slots adopted for insertion of a short limb of the "J" shaped harrow and carrier teeth wherein a long limb of the teeth is disposed downwardly from the tubular support member parallel to the short limb and substantially perpendicular to the plane of the reclaimer disk, a flat side of the spring "J" teeth facing in the direction of rotation of the reclaimer disk,
   c. means for removably attaching the "J" teeth to tubular support member, it being provided that the spring rate of the "J" teeth is high enough to permit normal reclaiming action but sufficiently resilient whereby on encountering zones of high resistance in the cohesive bulk material the "J" teeth deflect opposite in direction to the imposed force and returns to their original position after traversing the zone of high resistance.

2. The reclaimer disk of claim 1 wherein the cohesive material is phosphate shale.

3. The reclaimer disk of claim 1 wherein the hardened tips of the "J" teeth are bolted into place for field repair and maintenance.

4. The reclaimer disk of claim 1 wherein the short limb of the teeth are rigidly mounted between two adjacent holding members fixed in said open slots.

* * * * *

UNITED STATES PATENT AND TRADEMARK OFFICE
CERTIFICATE OF CORRECTION

PATENT NO. : 5,289,982
DATED : March 1, 1994
INVENTOR(S) : Ronald L. Andersen

It is certified that error appears in the above-indentified patent and that said Letters Patent is hereby corrected as shown below:

Column 1, line 9, "field" should read --Field--; line 14, "prior" should read --Prior--. Column 3, line 10, "1. Rocks and foreign matrix" should read --1. Rocks and foreign objects carried in the matrix--.

Signed and Sealed this

Twelfth Day of July, 1994

Attest:

BRUCE LEHMAN

*Attesting Officer*  *Commissioner of Patents and Trademarks*